United States Patent
Watanabe et al.

(10) Patent No.: US 7,320,153 B2
(45) Date of Patent: Jan. 22, 2008

(54) FOLD-TYPE DATA PROCESSING APPARATUS HAVING A HINGE

(75) Inventors: Yosuke Watanabe, Tokyo (JP); Masatomo Mizuta, Tokyo (JP); Mitsuru Sendouda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 11/452,934

(22) Filed: Jun. 15, 2006

(65) Prior Publication Data

US 2006/0230580 A1    Oct. 19, 2006

Related U.S. Application Data

(62) Division of application No. 10/721,880, filed on Nov. 26, 2003, now Pat. No. 7,096,540.

(30) Foreign Application Priority Data

Dec. 6, 2002    (JP) .............................. 2002-354555

(51) Int. Cl.
- *E05D 3/10* (2006.01)
- *E05D 17/64* (2006.01)
- *E05D 11/06* (2006.01)
- *E05D 5/10* (2006.01)

(52) U.S. Cl. ............................ 16/367; 16/337; 16/374; 16/386; 16/366

(58) Field of Classification Search ............... 16/337, 16/367, 374, 386, 339, 340, 342, 368, 351, 16/366; 403/118–120; 361/681–683, 803; 379/433.13, 434, 433, 428; 455/90, 550, 455/556, 575

See application file for complete search history.

(56) References Cited

U.S. PATENT DOCUMENTS

| | | | |
|---|---|---|---|
| 4,529,154 A | 7/1985 | Rinn et al. | |
| 5,335,142 A | 8/1994 | Anderson | |
| 6,347,433 B1 | 2/2002 | Novin et al. | |
| 6,742,221 B2 | 6/2004 | Lu et al. | |
| 6,798,646 B2 | 9/2004 | Hsu | |
| 6,804,861 B2 * | 10/2004 | Hsu ............................ | 16/366 |
| 6,883,206 B2 | 4/2005 | Yang et al. | |
| 6,912,122 B2 | 6/2005 | Chen et al. | |

(Continued)

FOREIGN PATENT DOCUMENTS

CN    1251927 A    5/2000

(Continued)

*Primary Examiner*—Flemming Saether
*Assistant Examiner*—David C Reese
(74) *Attorney, Agent, or Firm*—Sughrue Mion, Pllc.

(57) ABSTRACT

A fold-type cellular phone has a top unit, a bottom unit and a hinge coupling together the top unit and the bottom unit while allowing the top unit to turn and swivel with respect to the bottom unit. The top unit is first unfolded from a first folded position to an attitude angle of 160 to 170 degrees, and swiveled by 180 degrees to be folded onto the bottom unit in a second folded position at an attitude angle of 180 degrees. The swivel movement of the top unit causes a cam assembly to turn the top unit from the attitude angle of 160-170 degrees to an attitude angle of 180 degrees in the second folded position, thereby allowing the top unit to assume a suitable attitude with respect to the bottom unit.

17 Claims, 12 Drawing Sheets

U.S. PATENT DOCUMENTS

| | | |
|---|---|---|
| 2002/0107043 A1 | 8/2002 | Adamson et al. |
| 2003/0040288 A1 | 2/2003 | Kang et al. |
| 2003/0132079 A1 | 7/2003 | Bellini |
| 2004/0107540 A1 | 6/2004 | Hsu |
| 2005/0150081 A1* | 7/2005 | Gan ........................... 16/367 |
| 2005/0160558 A1* | 7/2005 | Kim ........................... 16/367 |
| 2005/0198779 A1* | 9/2005 | Jung et al. ..................... 16/367 |

FOREIGN PATENT DOCUMENTS

| | | |
|---|---|---|
| JP | 11-215218 A | 8/1999 |
| JP | 2002-158758 A | 5/2002 |

* cited by examiner

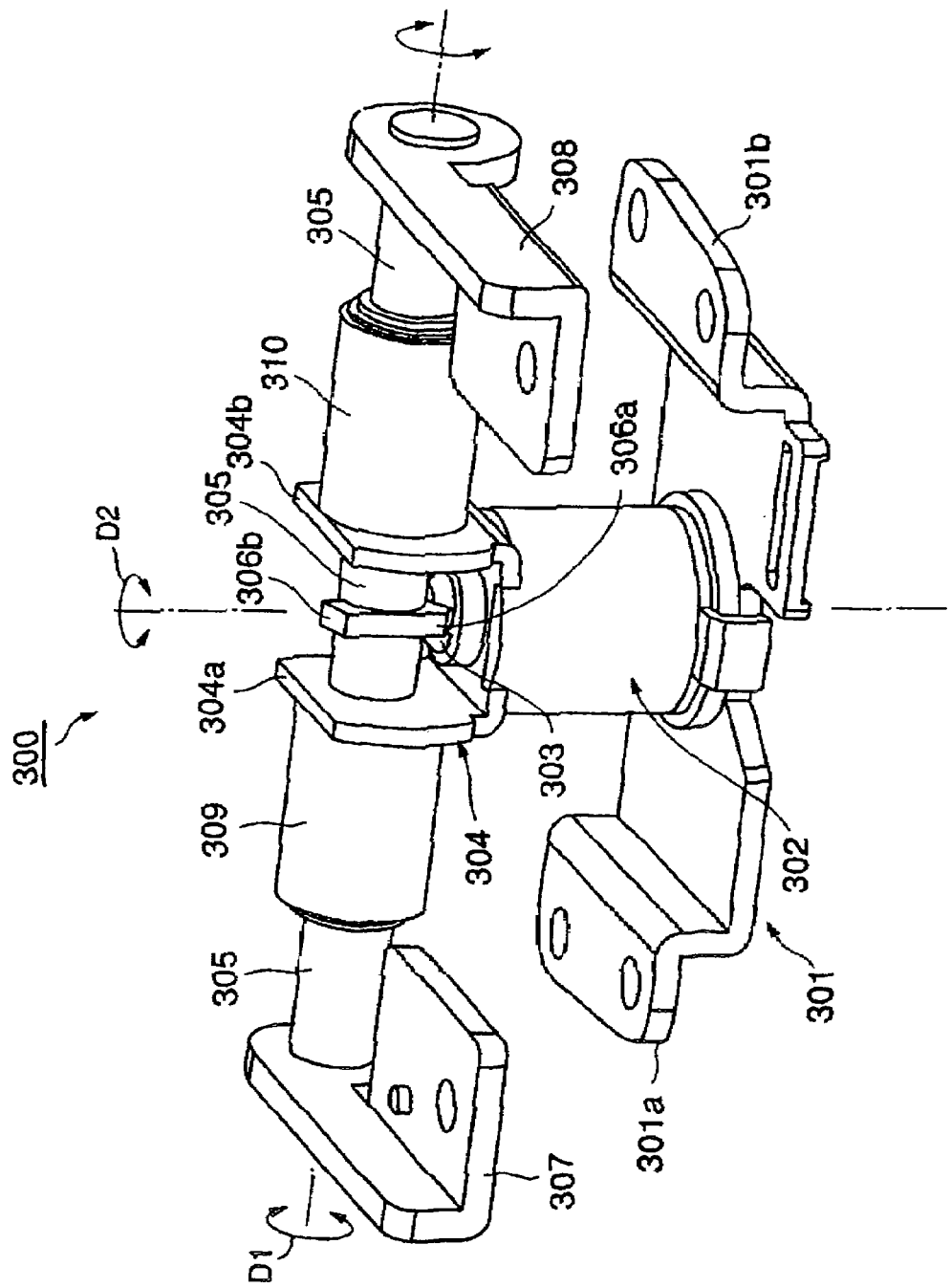

FOLD-TYPE DATA PROCESSING APPARATUS HAVING A HINGE

This is a divisional of U.S. patent application Ser. No. 10/721,880, filed Nov. 26, 2003 now U.S. Pat. No. 7,096,540, which claims priority from Japanese Patent Application No. 2002-354555, filed Dec. 6, 2002, the entire disclosures of which are incorporated herein by reference.

BACKGROUND OF THE INVENTION (a) Field of the Invention

The present invention relates to a fold-type data processing apparatus having a hinge and, more particularly, to a fold-type data processing apparatus, such as cellular phone, hand-held personal computer and portable data assistant, having a hinge mechanism therein.

(b) Description of the Related Art

Recent cellular phones have a variety of functions in addition to the conventional telephone function, such as internet browser, e-mail and schedule management functions. Thus, the cellular phone may be referred to as a portable data processing apparatus or personal data assistant. This fact necessitates the cellular phone to have a larger-size display unit to display thereon a larger amount of image information including figures as well as characters and numerals.

To solve a trade-off between a larger-size screen for the display unit and a smaller weight of the cellular phone as encountered in the conventional technique, a fold-type structure is increasingly used for the chassis of the cellular phone. In general, the fold-type structure of the cellular phone is such that the chassis of the cellular phone has a top chassis section (top unit) and a bottom chassis section (bottom unit) coupled together via a hinge, and the display unit and the keyboard are exposed for operation by unfolding the top chassis section with respect to the bottom chassis section. A fold-type structure has been proposed wherein the screen of the display unit is exposed in a folded position of the chassis for allowing the cellular phone to function as an e-mail or browser unit without switch-ON of the telephone function.

JP Patent Publication 11(1999)-215218 (first publication) describes a fold-type structure of the cellular phone wherein the top chassis section mounting thereon a display unit and the bottom chassis section mounting thereon a keyboard are coupled together via a ball joint for allowing swiveling of the top chassis section in any direction with respect to the bottom chassis section.

In the fold-type structure described in the first publication, it is difficult to fix the relative attitude of the top chassis section with respect to the bottom chassis section during an unfolded position thereof, because both the sections are coupled via the ball joint. This rather hinders the user from handling the cellular phone comfortably.

JP Patent Publication 2002-158758 (second publication) describes a fold-type structure of the cellular phone, wherein the top chassis section mounting thereon a display unit and the bottom chassis section mounting thereon a keyboard are coupled together for allowing swiveling of the top chassis section with respect to the bottom chassis section so that the operating planes of the display unit and the keyboard are directed in the same direction.

In the fold-type structure described in the second publication, if one of the chassis sections is swiveled with respect to the other, with surface portions of both the chassis sections being in contact with one another, the contacted surface portions may have mechanical damages thereon. This problem is common to the fold-type structure described in the first publication.

SUMMARY OF THE INVENTION

It is an object of the present invention to provide a fold-type data processing apparatus having an improved hinge mechanism therein, wherein the relative attitude between two chassis sections is controlled with ease.

It is another object of the present invention to provide a fold-type data processing apparatus having an improved hinge mechanism, wherein two chassis sections are prohibited from swiveling with respect to one another when the surface portions of two chassis sections are in contact with one another.

It is a further object of the present invention to provide such an improved hinge mechanism.

The present invention provides a fold-type data processing apparatus including a first unit, a second unit and a hinge mechanism for coupling together the first unit and the second unit and allowing the second unit to turn and swivel with respect to the first unit via the hinge mechanism, the hinge mechanism including: a shaft having a first axis and mounting thereon the second unit for allowing the second unit to be turned around the first axis; a swiveling member fixed onto the first unit and allowing the shaft and the second unit to swivel with respect to the first unit around a second axis perpendicular to the first axis; at least one projection member fixed onto the shaft; and a control member fixed onto the first unit and having a side wall, at least a portion of the side wall having a slanted surface, wherein the projection member abuts the side wall to restrict a movement of the second unit.

The present invention also provides a hinge mechanism including: a base; a shaft having a first axis; a first support member for supporting the shaft and allowing the shaft to rotate around the first axis; a second support member for supporting the first support member with respect to the base and allowing the first support member and the shaft to swivel with respect to the base around a second axis perpendicular to the first axis; and a cam assembly for converting a swivel movement of the shaft with respect to the base to a rotational movement of the shaft.

In accordance with the fold-type data processing apparatus of the present invention, the attitude of the second unit with respect to the first unit is controlled by the rotational movement of the shaft converted from the swivel movement of the second unit while using the projection member on the shaft and the control member fixed onto the first unit. Thus, a desired attitude of the second unit can be obtained by the swivel movement of the second unit.

In accordance with the hinge mechanism of the present invention, the cam assembly converts the swivel movement of the shaft to the rotational movement of the shaft, whereby a desired rotational movement can be obtained simply by swiveling the rotational shaft. The above and other objects, features and advantages of the present invention will be more apparent from the following description, referring to the accompanying drawings.

BRIEF DESCRIPTION OF THE DRAWINGS

FIG. 2 is a perspective view of the hinge used in the cellular phone of FIG. 1A.

PREFERRED EMBODIMENTS OF THE INVENTION

Figure 1A:
FIG. 1A is a top plan view of a cellular phone having top and bottom chassis sections in a first folded position of chassis, and shown as a fold-type data processing apparatus according to a first embodiment of the present invention.

Now, the present invention is more specifically described with reference to accompanying drawings, wherein similar constituent elements are designated by similar reference numerals. It is to be noted that the present invention is an improvement from the inventions described in JP Patent Applications 2001-30395, 2002-107405 and 2002-189488 which describe improvements of operational functions and hinges of cellular phones, and is devised based especially on the invention described in 2002-107405.

First Embodiment

Referring to FIGS. 1A to 1D, there are shown a plurality of attitudes of the chassis of a cellular phone, generally designated by numeral 10 and shown as a fold-type data processing apparatus according to a first embodiment of the present invention. More specifically, FIGS. 1A to 1D show a first folded position (first closed position) of a top chassis section (top unit) of the cellular phone 10, wherein the top unit is folded onto a bottom chassis section (bottom unit), an unfolded position (open position) wherein the top unit 200 is unfolded from the bottom unit 100 by turning the top unit 200 in the direction D1 from the first folded position of FIG. 1A via a hinge 300 fixed onto the bottom unit 100, a swiveled position wherein the top unit 200 is swiveled by 90 degrees in the direction D2 via the hinge 300 from the unfolded position of FIG. 1B, and a second folded position wherein the top unit 200 is further swiveled by 90 degrees in the direction D2 via the hinge 300 from the swiveled position of FIG. 1C, respectively.

The hinge 300 in the cellular phone 10 is of a two-axial structure and couples the top unit 200 and the bottom unit 100 together so that the top unit 200 can be turned and swiveled via the hinge 300 with respect to the bottom unit 100. The top unit 200 can be turned in the direction D1 via the hinge 300 for closing and exposing the surface of the bottom unit 100, and can be swiveled in the direction D2 via the hinge 300 with respect to the bottom unit 100 from the unfolded position. The bottom unit 100 mounts a keyboard 101 and a microphone 102 on the main surface thereof, whereas the top unit 200 mounts an elongate display unit 201 and a speaker 202 on the main surface thereof.

In the first folded position of FIG. 1A, the main surfaces of both the top and bottom units 200 and 100 oppose one another, whereby the keyboard 101 and the display unit 201 are protected against an external force by both the top and bottom units 200 and 100, respectively. In the first folded position, the hinge 300 restricts the swiveling of the top unit 200 in the direction D2. In a slightly unfolded position wherein the top unit 200 is slightly turned in the direction D1 with respect to the bottom unit 100 via the hinge 300, the top unit 200 is released from the restriction of the swiveling in the direction D2 by the hinge 300.

Figure 1B:
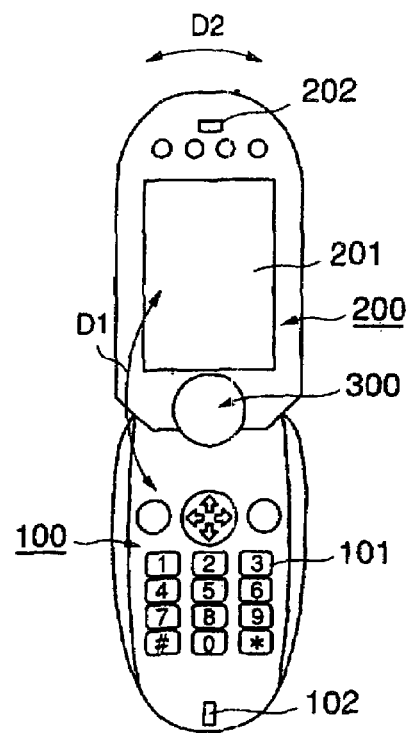
FIG. 1B is a top plan view of the cellular phone of FIG. 1A in an unfolded position of the chassis.

In the unfolded position of FIG. 1B wherein the top unit 200 is turned in the direction D1, the keyboard 101, display unit 201, microphone 102 and speaker 202 are exposed from the chassis, thereby allowing operation of the cellular phone 10 for dialing a call number, key input, speaking etc. The hinge 300 restricts the attitude angle of the top unit 200 with respect to the bottom unit 100 within a range between 160 degrees and 170 degrees in the direction D1 in the unfolded position of FIG. 1B, whereas the hinge 300 releases the restriction of the swiveling of the top unit 200 in the direction D2 in the unfolded position whereby the top unit 200 can be swiveled for any desired angle. When the top unit 200 is swiveled in the direction D2, the angle between the main surface of the top unit 200 may be maintained within the range between 160 degrees and 170 degrees with respect to the main surface of the bottom unit 100. In an alternative, the angle between the main surfaces may be increased with the increase of the swiveled angle of the top unit 200.

Figure 1C:
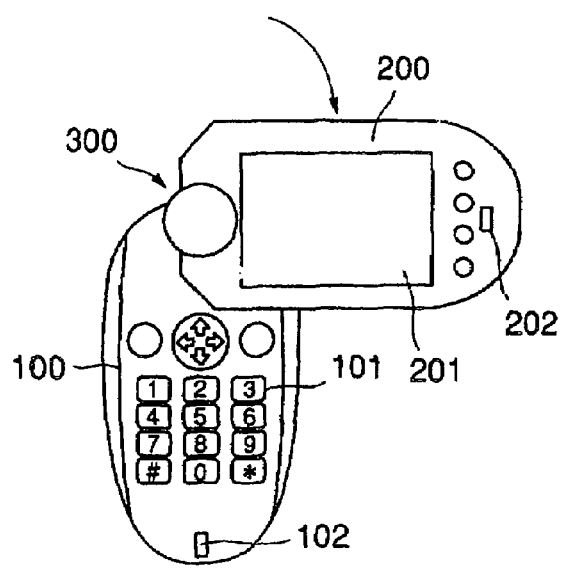
FIG. 1C is a top plan view of the cellular phone of FIG. 1A in a swiveled position wherein the top chassis section is swiveled with respect to the bottom chassis section from the unfolded position of FIG. 1B.

In the swiveled position of FIG. 1C wherein the top unit 200 is swiveled by 90 degrees in the direction D2 from the unfolded position of FIG. 1B, the top unit 200 may be temporarily fixed by a snapping engagement at the 90-degree swiveled position. In such a case, the angle between the main surfaces of both the top unit 200 and the bottom unit 100 may be maintained at 160 to 170 degrees or may be increased up to 180 degrees and fixed thereto.

Figure 1D:
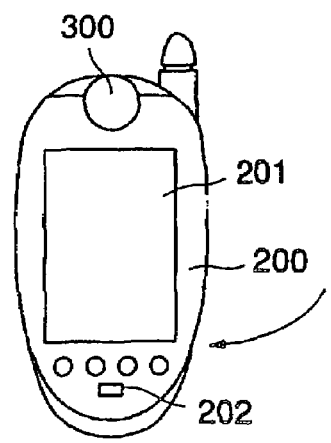
FIG. 1D is a top plan view of the cellular phone of FIG. 1A in a second folded position of the chassis.

In the second folded position of FIG. 1D wherein the top unit 200 is further swiveled by 90 degrees via the hinge 300 in the direction D2 from the position of FIG. 1C, the top unit 200 is fixed onto the bottom unit 100 with the display unit 201 being exposed from the chassis at the top thereof. The hinge 300 also restricts the swiveling of the top unit 200 in the second folded position, whereas the hinge 300 allows swiveling of the top unit 200 by 360 degrees in the direction D2 in a slightly unfolded position wherein the top unit 200 is slightly turned in the direction D1 with respect to the bottom unit 100 from the second folded position.

Now the two-axial structure of the hinge 300 will be detailed hereinafter.

Referring to FIG. 2, the hinge 300 includes a base plate 301 provided with a pair of brackets 301a and 301b at both the ends thereof, which are fixed onto the bottom unit 100 for fixing the hinge 300. The hinge 300 includes a torque generator 302 having a cylindrical post standing vertically at the center of the base plate 301 and mounting, at the top thereof, a control member (or control projection) 303 and a coupling bracket 304 for controlling the attitude angle between the top unit 200 and the bottom unit 100 during the swivel movement of the top unit 200.

The control member 303 is fixed onto a fixed shaft (not shown in the drawing) of the torque generator 302 which is fixed onto the base plate 301. The coupling bracket 304 is of a U-character shape, and has a bottom plate fixed onto the cylindrical post of the torque generator 302 and a pair of side plates 304a and 304b extending from both the ends of the bottom plate in the direction perpendicular to the bottom plate. The control member 303 penetrates the bottom plate of the coupling bracket 304 for allowing swiveling of the coupling bracket 304 with respect to the control member 303 in the direction D2 around the fixed shaft of the cylindrical post of the torque generator 302. The torque generator 302 generates a torque in the direction D2 between the fixed shaft and the cylindrical post of the torque generator 302, the torque providing a snapping engagement or slight temporary engagement during rotation of the cylindrical post, as will be detailed later.

A shaft 305 rotatably penetrates the side plates 304a and 304b of the coupling bracket 304. The portion of the shaft 305 sandwiched between the side plates 304a and 304b of the coupling bracket 304 has a pair of projections 306a and 306b at the central position thereof, thereby allowing the projections 306a and 306b to abut the control member 303. The projections 306a and 306b function as swivel stoppers for stopping the swiveling of the shaft 305 by the abutment to the control member 303. The provision of the projections 306a and 306b increases the design choice for the position and configuration of the control member 303.

Figure 3A:
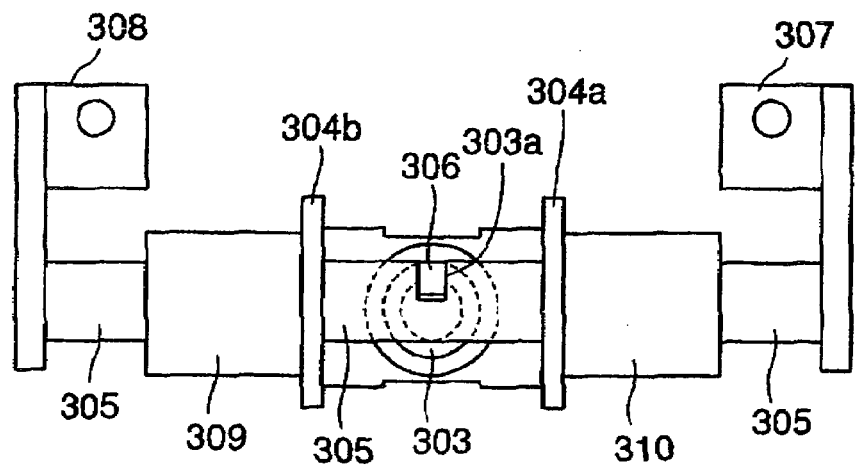
FIGS. 3A and 3B are a schematic top plan view and side view, respectively, of the hinge of FIG. 2.
Figure 3B:
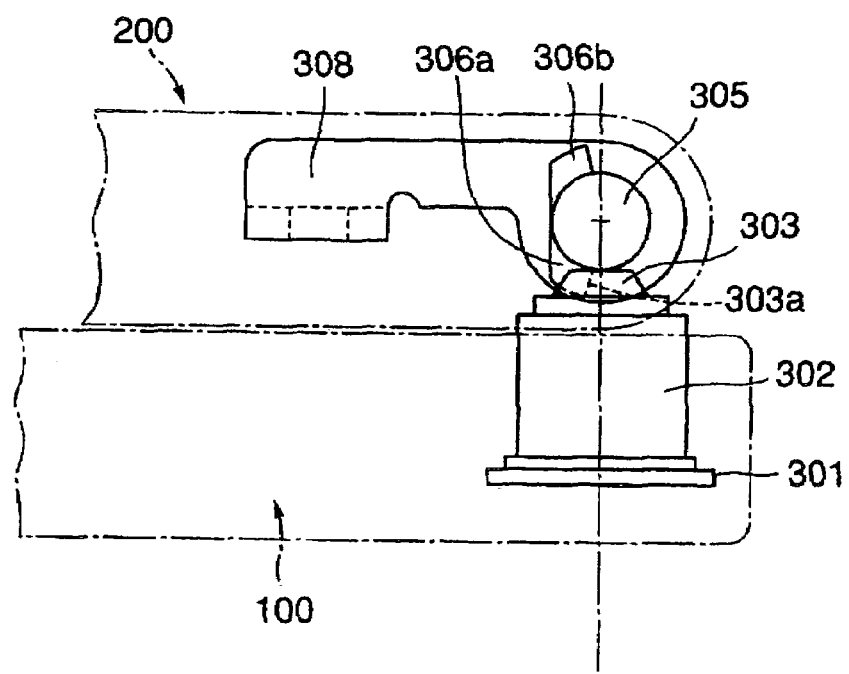

Referring to FIGS. 3A and 3B, the control member 303 is of a truncated cone and has a slot 303a on the slanted side wall thereof. The slot 303a has vertical side walls and receives therein the tip of projection 306a or 306b.

FIG. 3B shows the hinge 300 in the folded position of FIG. 1A wherein the top unit 200 is folded onto the bottom unit 100. In the folded position, the first projection 306a on the shaft 305 is received in the slot 303a of the control member 303, whereby the top unit 200 cannot swivel in the direction D2.

L-shaped brackets 307 and 308 are provided on both the ends of the shaft 305, and fixed onto the top unit 200. Folding/unfolding torque generators 309 and 310 are fixed onto both the side surfaces 304a and 304b, respectively, of the coupling bracket 304, allowing the shaft 305 to penetrate therethrough, whereby a turning torque is generated in the direction D1 as in the case of the swiveling torque generator 302. This turning torque also generates a snapping engagement during folding and unfolding the top unit 200.

Figure 4:
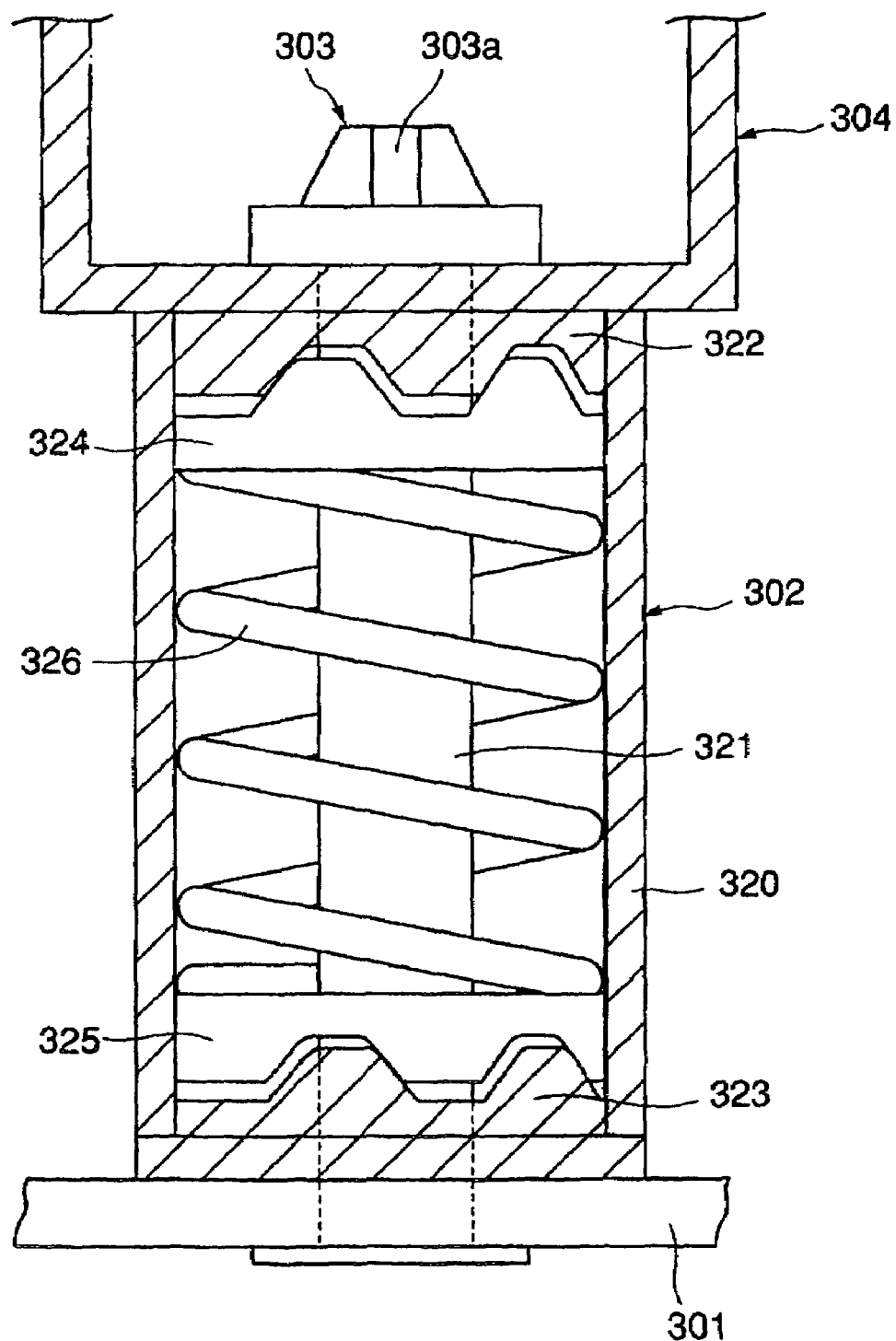
FIG. 4 is a sectional view of the torque generator disposed in the hinge of FIG. 2.

Referring to FIG. 4, there is shown a schematic configuration of the swiveling torque generator 302. The swiveling torque generator 302 includes a hollow cylindrical post 320, and a cylindrical fixed shaft 321, a pair of rotation cams 322 and 323, a pair of fixed cams 324 and 325 and a coil spring 326 which are received in the hollow cylindrical post 302. The fixed shaft 321 penetrates the top plate and bottom plate of the cylindrical post 320 for allowing rotation thereof, has a bottom end fixed onto the base plate 301 and a top end on which the control member 303 is fixed.

The pair of rotation cams 322 and 323 are respectively fixed onto the inner surfaces of the top plate and the bottom plate of the cylindrical post 320. The fixed shaft 321 penetrates the pair of rotation cams 322 and 323 for allowing rotation thereof. The pair of fixed cams 324 and 325 have configurations matched with the shapes of the rotation cams 322 and 323, respectively, allowing the fixed shaft 321 to penetrate therethrough. The fixed cams 324 and 325 are fixed onto the fixed shaft 321 in the rotational direction by a suitable means and allowed to move in the axial direction of the fixed shaft 321. The coil spring 326 is sandwiched between the fixed cams 324 and 325, thereby urging the fixed cams 324 and 325 in the opposite directions.

A specific combination of the rotation cam 322 and the fixed cam 324 as well as a specific combination of the rotation cam 323 and the fixed cam 325 is employed wherein the convex and concave positions of the rotation cam 322 or 323 having a periodic structure are suitably combined with the concave and convex positions of the fixed cam 324 or 325 with a period of 90 degrees. This combination generates a pull-in torque to pull the top unit 200 toward each of the swivel positions of the top unit 200 shown in FIGS. 1A to 1D in the vicinity of the each of the swivel positions. It is to be noted that by slightly deviating the phase of the concave and convex positions between the rotation cam and the fixed cam, a rattling torque can be avoided during generation of the snapping engagement.

The turning torque generators 309 and 310 by which the folding/unfolding torque is generated during folding and unfolding the top unit 200 have basic configurations similar to those of FIG. 4. It is to be noted however that the pull-in torque is generated by the cam assembly in the vicinity of attitude angles of zero and 180 degrees between the top unit 200 and the bottom unit 100. In particular, a pull-in torque should be generated at a position around an attitude angle of 160 to 170 degrees, such as the position illustrated in FIG. 1B, to pull in the top unit 200 toward an attitude angle of 180 degrees.

As described above, FIGS. 2, 3A and 3B show the hinge at the folded position of the chassis. In the folded position, one of the projections 306a and 306b, i.e., the first projection 306a, on the shaft 305 is received in the slot 303a of the control member 303, whereby the top unit 200 cannot be swiveled in the direction D2.

Figure 5A:
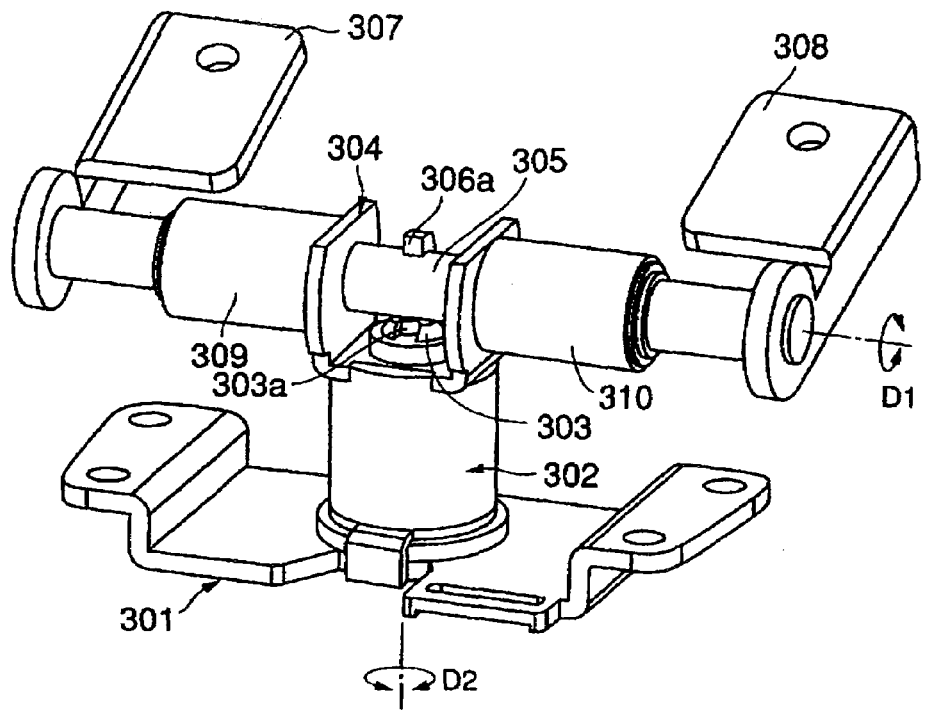
FIGS. 5A and 5B are a perspective front view and rear view, respectively, of the hinge of FIG. 2 in an unfolded position of the chassis.
Figure 5B:
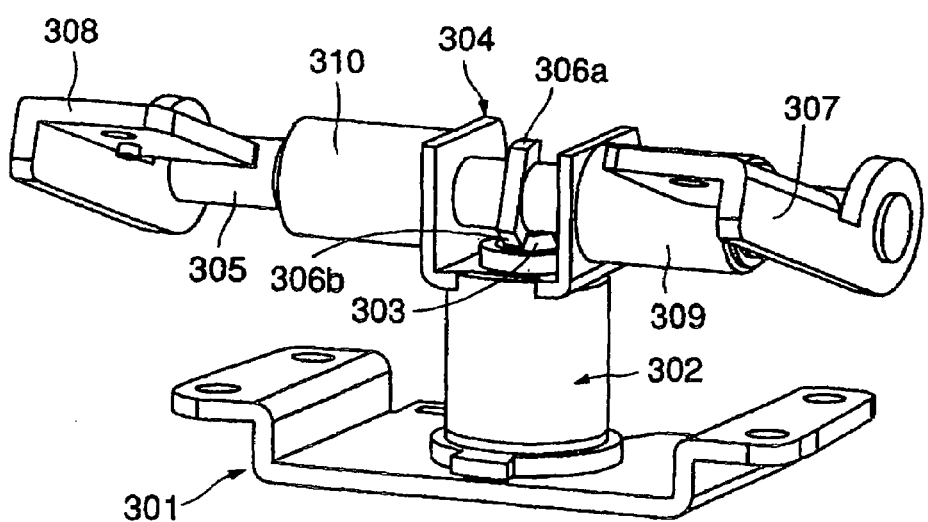

FIG. 5A shows the front view of the hinge in an unfolded position of the chassis, such as the position shown in FIG. 1B, whereas FIG. 5B shows the rear view of the hinge in the unfolded position.

When the top unit 200 is unfolded from the folded position by turning the top unit 200 in the direction D1, as shown in FIG. 5A, the first projection 306a is located outside the slot 303a of the control member 303, whereby the top unit 200 can be swiveled in the direction D2. If the top unit 200 is further turned in the direction D1, as shown in FIG. 5B, the second projection 306b on the shaft 305 abuts the side wall of the control member 303 and thus is stopped thereby. Thus, the maximum angle of the top unit 200 with respect to the bottom unit 100 during the turning of the top unit 200 is determined by the position of the rear side wall of the control member 303.

The top unit 200 is then swiveled from the unfolded position of FIG. 5B in the direction D2. During the swiveling operation, the turning torque generators 309 and 310 generate a pull-in torque on the shaft 305 toward a 180-degree attitude of the top unit 200 with respect to the bottom unit 100, whereby the second projection 306b on the shaft 305 moves along the side wall of the control member 303 while abutting thereto.

Figure 6A:
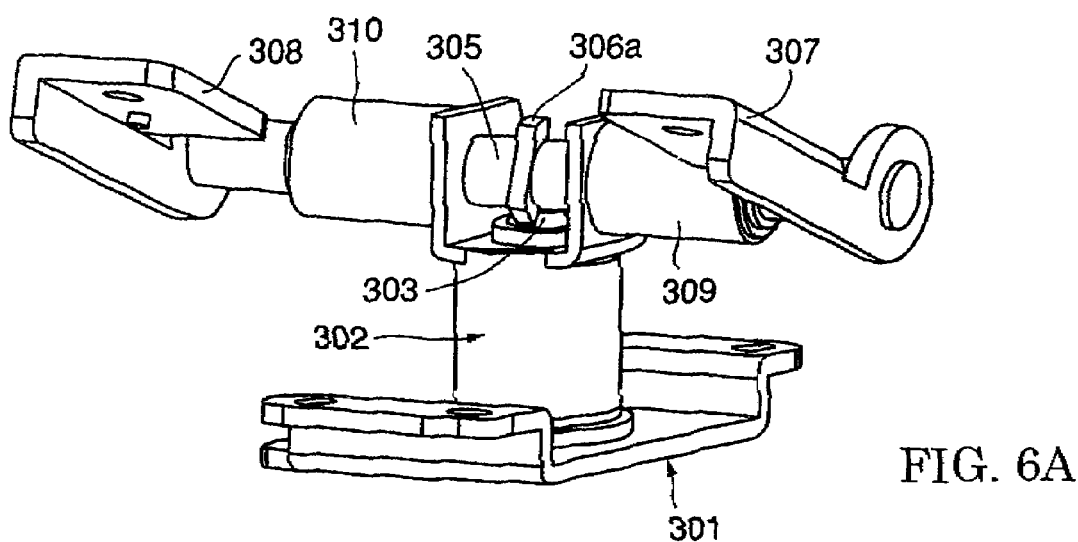
FIG. 6A is a perspective side view of the hinge of FIG. 2 in a 90-degree swiveled position of the chassis.
Figure 6B:
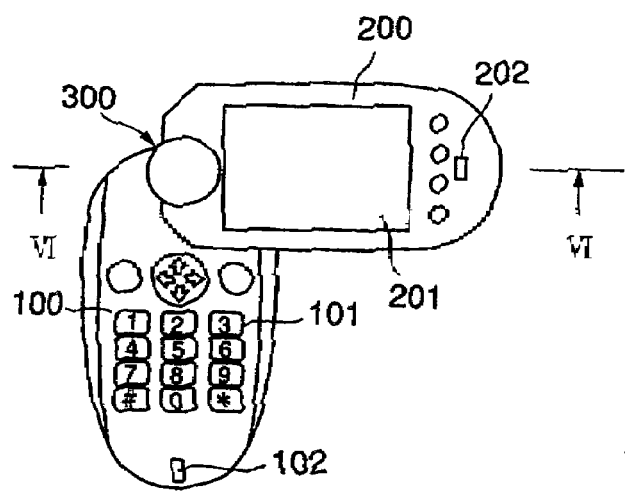
FIG. 6B is a top plan view of the cellular phone in this swiveled position.
Figure 6C:
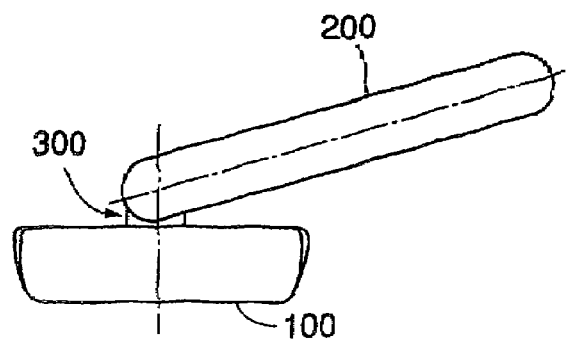
FIG. 6C is a sectional view taken along line VI-VI in FIG. 6B.

FIG. 6A shows the hinge at a 90-degree swiveled position wherein the top unit 200 is swiveled from the unfolded position by 90 degrees. The 90-degree swiveled position of the cellular phone is shown in FIGS. 6B and 6C, wherein FIG. 6C is taken along line VI-VI in FIG. 6B.

In the 90-degree swiveled position wherein the top unit 200 is swiveled by 90 degrees from the unfolded position, the second projection 306b still abuts the side wall of the control member 303, as shown in FIG. 6A. The truncated-cone shape of the control member 303 allows the top unit 200 to maintain the 160-degree attitude with respect to the bottom unit 100 in the 90-degree swiveled position of the top unit 200.

When the top unit 200 is further swiveled to reach a 180-degree swiveled position, the second projection 306b reaches the slot 303a of the control member 303 and is received therein, whereby the top unit 200 cannot be swiveled any more in the direction D2. In the 180-degree swiveled position, the top unit 200 covers the bottom unit 100, with the display unit 201 of the top unit 200 being exposed at the top of the chassis, as shown in FIG. 1D.

Figure 7A:
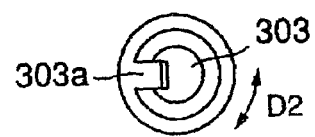
FIG. 7A is a top plan view of a control member for controlling the attitude angle between the chassis sections.
Figure 7B:
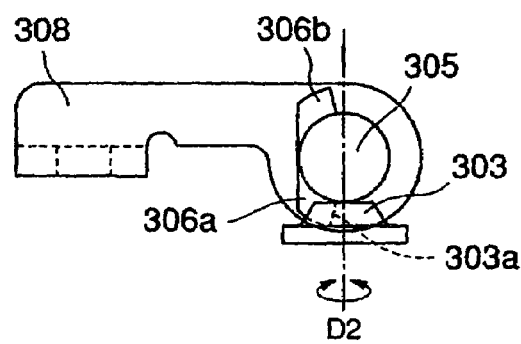
FIG. 7B is a schematic side view of the hinge in the folded position.
Figure 7C:
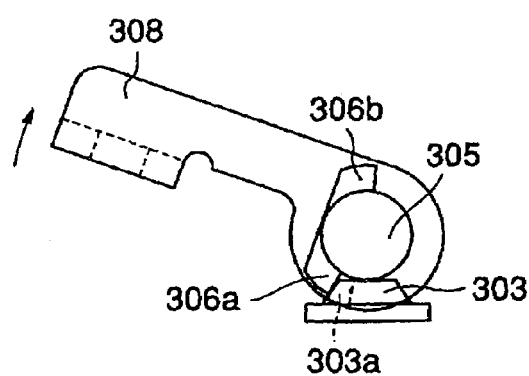
FIG. 7C is a schematic side view of the hinge of FIG. 7B in a slightly-unfolded position.
Figure 7D:
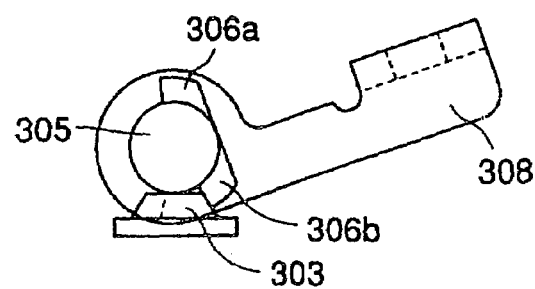
FIG. 7D is a schematic side view of the hinge in the unfolded position.

FIGS. 7A to 7D show the control mechanism of the hinge, wherein FIG. 7A is a top plan view of the control member 303, FIG. 7B is a schematic side view of the hinge in the first folded position, FIG. 7C is another schematic side view of the hinge in a slightly unfolded position, and FIG. 7D is another schematic side view of the hinge in an initial full-unfolded position.

As illustrated in FIG. 7A, the control member 303 is located at the swivel center, and has a slot 303a on the side wall of the truncated cone at the front side thereof. The slot 303a has a width suited for receiving the tip portion of projection 306a or 306b, and a depth determined so that the top unit 200 is folded onto the bottom unit 100 at an attitude angle of zero degree upon receipt of the projection 303a or 303b by the slot 303a. It is to be noted that the bottom surface of the slot 303a is also slanted, whereby the projection 303a or 303b suitably abuts the bottom surface at the slanted abutment surface of the projection 303a or 303b.

In the folded position of the top unit 200 shown FIG. 7B, the first projection 306a is received in the slot 303a of the control member 303, whereby the top unit 200 is folded onto the bottom unit 100 at an attitude angle of zero degree with respect thereto. The receipt of the first projection 306a by the slot 303a prohibits the swivel movement of the top unit 200 in the direction D2, thereby preventing rubbing or friction between the main surfaces of the top unit 200 and the bottom unit 100 in the folded position. In addition, an unintended swivel movement of the top unit 200 by an external force is also avoided, the external force being applied to any of the top unit 200 and the bottom unit 100.

In the slightly unfolded position of the top unit 200 shown in FIG. 7C, for example, at an attitude angle of several degrees, the first projection 306a on the shaft 305 is located outside the slot 303a, whereby the top unit 200 can be swiveled in the direction D2 by 360 degrees. In other words, the top unit 200 cannot be swiveled unless the top unit 200 is unfolded or lifted with respect to the bottom unit 100 via the hinge 300.

In the initial full-unfolded position of the top unit 200 shown in FIG. 7D, the second projection 306b on the shaft 305 abuts the rear side wall of the control member 303 and is stopped thereby. This determines the attitude angle of the initial full-unfolded position between the top unit 200 and the bottom unit 100. The subsequent swivel movement of the top unit 200 is not iterated herein for avoiding a duplication.

Second Embodiment

FIGS. 8A to 8D illustrate the control member 303, a first folded position, an unfolded position and a second folded position, respectively, of the hinge used in a data processing apparatus according to a second embodiment of the present invention. The second embodiment is similar to the first embodiment except for the configuration of the control member.

Figure 8A:
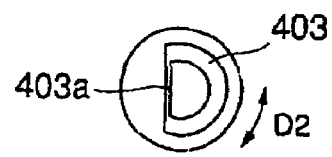
FIG. 8A is a top plan view of a control member for controlling the attitude angle between the chassis sections of the hinge in a cellular phone shown as a fold-type data processing apparatus according to a second embodiment of the present invention.

As shown in FIG. 8A, the control member 403 in the present embodiment is located at the swivel center of the top unit 200, and has a shape of partial truncated cone, wherein a front portion of a truncated cone is cut off along a plane passing chords of the top and bottom circles of the truncated cone. Thus, the control member 403 has a trapezoid plane 403a at the front side thereof. The location of the trapezoid plane 403a is determined so that the top unit 200 is folded onto the bottom unit 100 at an attitude angle of zero degree with respect thereto upon abutment of projection 306a or 306b on the shaft 305 to the trapezoid plane 403a. It is to be noted that the trapezoid plane 403a is slightly slanted corresponding to the slanted abutment surface of projection 306a or 306b.

Figure 8B:
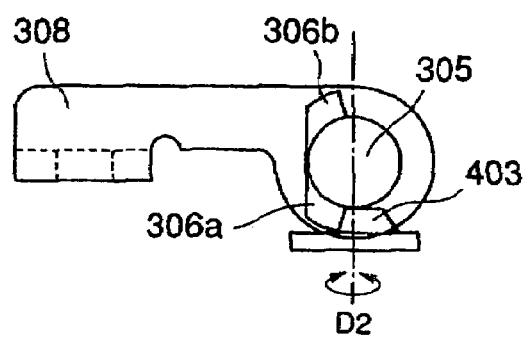
FIG. 8B is a schematic side view of the hinge in the first folded position of the hinge in the second embodiment.

As illustrated in FIG. 8B, in the hinge during the folded position, the first projection 306a on the shaft 305 abuts the trapezoid plane 403a of the controlling projection 403, whereby the top unit 200 is folded onto the bottom unit 100 at an attitude angle of zero degrees with respect thereto. The first projection 306a abutting the trapezoid plane 403a prevents the top unit 200 from swiveling in the direction D2, thereby preventing rubbing or friction between the main surfaces of the top unit 200 and the bottom unit 100 in the folded position. In addition, an unintended swivel movement of the top unit 200 by an external force is also avoided.

When the top unit 200 is slightly unfolded from the bottom unit 100, the first projection 306a is released from the trapezoid plane 403a of the controlling projection 403, whereby the top unit 200 can be swiveled in the direction D2 within the range defined by the trapezoid plane 403a. In other words, the top unit 200 cannot be swiveled without unfolding or raising the top unit 200 with respect to the bottom unit 100 via the hinge.

Figure 8C:
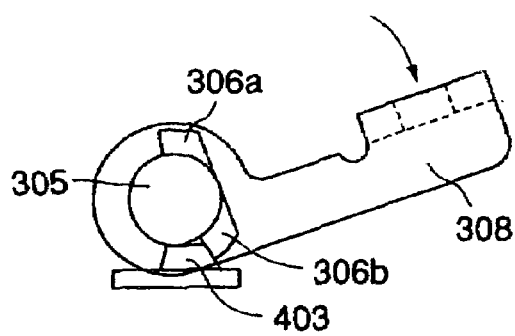
FIG. 8C is a schematic side view of the hinge in an unfolded position thereof in the second embodiment.
Figure 8D:
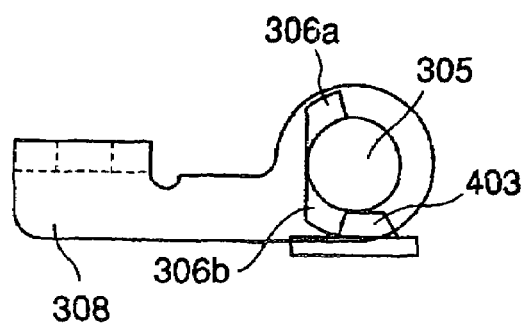
FIG. 8D is a schematic side view of the hinge in the second folded position thereof in the second embodiment.

After the top unit 200 is further unfolded or raised, as shown in FIG. 8C, the second projection 306b abuts the rear side wall of the control member 403 and thus is stopped thereby, whereby the attitude angle between the top unit 200 and the bottom unit in the unfolded position is defined at 160 degrees in the present embodiment.

When the top unit 200 is swiveled in the direction D2 from the unfolded position of FIG. 8C, the second projection 306b moves along the side wall of the control member while abutting thereto. After the top unit 200 is swiveled by 90 degrees, the second projection 306b on the shaft 305 is located on the lateral side of the control member 403. In the present embodiment, the control member 403 having a truncated conical shape except for the trapezoid plane 403a maintains the initial attitude angle between the top unit 200 and the bottom unit 100 after the 90-degree swiveling movement of the top unit 200.

When the top unit 200 is further swiveled in the direction D2, the second projection 306b abuts the trapezoid 403a of the control member 403. In this position, the top unit 200 is folded onto the bottom unit 100 at an attitude angle of 180 degrees with respect to the bottom unit 100, with the display unit on the top unit 200 being exposed at the top of the chassis. The trapezoid plane 403a in association with the second projection 306b prevents the swiveling of the top unit 200 at the 180-degree swiveled position.

Third Embodiment

FIGS. 9A to 9D illustrate, similarly to FIGS. 8A to 8D, respectively, the hinge used in a data processing apparatus according to a third embodiment of the present invention. The third embodiment is similar to the first embodiment except for the configuration of control member in the hinge.

Figure 9A:
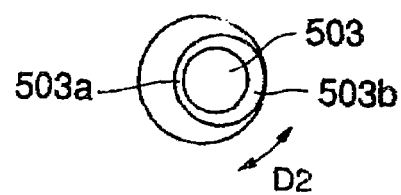
FIG. 9A is a top plan view of a control member for controlling the attitude angle between the chassis sections of the hinge in a cellular phone shown as a fold-type data processing apparatus according to a third embodiment of the present invention.

As illustrated in FIG. 9A, the control member 503 in the hinge is disposed at the location deviated from the swivel axis of the top unit 200 toward the rear side, and has a configuration wherein the slanted angle of the side wall of the truncated cone is moderately changed along the circumferential direction. More specifically, the control member 503 has a maximum slanted angle at the front side 503a and a minimum slanted angle at the rear side 503b, wherein the slanted angle increases from the rear side toward the front side as viewed in the circumferential direction. The maximum slanted angle at the front side is determined so that the projection 306a or 306b abutting the side wall at the front side allows the top unit 200 to be folded at an attitude angle of zero degree with respect to the bottom unit 100. On the other hand, the minimum slanted angle at the rear side is determined so that the second projection 306b abutting the side wall at the rear side allows the top unit 200 to be unfolded to an attitude angle of 160 degrees with respect to the bottom unit 100.

Figure 9B:
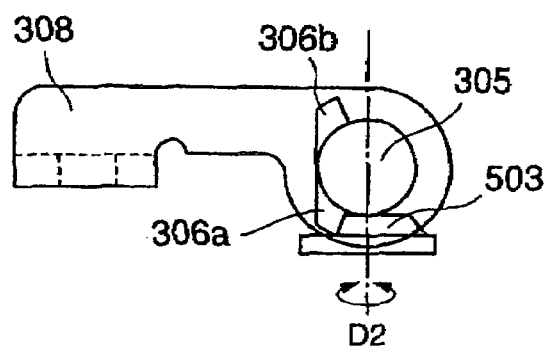
FIG. 9B is a schematic side view of the hinge in the first folded position thereof in the third embodiment.

As illustrated in the folded position shown in FIG. 9B, the first projection 306a abuts the front side 503a of the control member 503, whereby the top unit 200 is folded at an attitude angle of zero degree with respect to the bottom unit 100. A slot, such as the slot 303a in the first embodiment, may be formed on the front side 503a of the control member 503 for preventing the top unit 200 from swiveling in the direction D2.

Figure 9C:
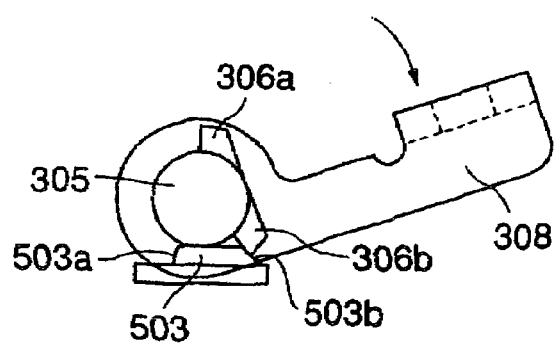
FIG. 9C is a schematic side view of the hinge in an unfolded position thereof in the third embodiment.

When the top unit 200 is unfolded, as shown in FIG. 9C, the second projection 306b abuts the rear side 503b of the control member 503 and is stopped thereby, whereby the attitude angle of the top unit 200 with respect to the bottom unit 100 is determined at 160 degrees.

When the top unit 200 is swiveled in the direction D2 from the unfolded position of FIG. 9C, the second projection 306b moves along the side wall of the control member 503 while abutting thereto. The configuration wherein the slanted angle of the control member 503 increases from the rear side 503b toward the front side 503a allows the attitude angle of the top unit 200 with respect to the bottom unit 100 to increase from 160 degrees during the swiveling.

Figure 9D:
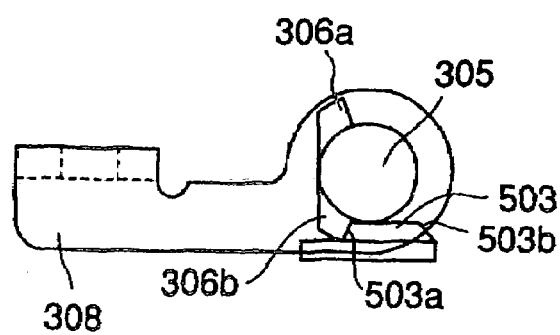
FIG. 9D is a schematic side view of the hinge in the second folded position thereof in the third embodiment.

After the top unit 200 is further swiveled to allow the second projection 306b to reach the front side 503a, as shown in FIG. 9D, the top unit 200 is folded onto the bottom unit 100 at an attitude angle of 180 degrees, with the display unit 210 being exposed on the top of the chassis.

The contour of the control member 503 in the present embodiment may cause a higher load compared to the case of the truncated cone in the first embodiment during the swivel movement of the top unit 200 in the direction D2. This higher load can be lowered by a configuration wherein the abutment surfaces of the projections 306a and 306b matches with the side wall of the control member 503, as will be described later with reference to FIG. 12.

Fourth Embodiment

FIGS. 10A to 10D illustrate, similarly to FIGS. 8A to 8D, the hinge in a fourth embodiment of the present invention. The present embodiment is similar to the first embodiment except for the configuration of the control member in the hinge. FIG. 11A shows the cellular phone of the present embodiment at a swiveled angle of 90 degrees for the top unit 200 with respect to the bottom unit 100, and FIG. 11B is a sectional view taken along line XI-XI in FIG. 11A.

Figure 10A:
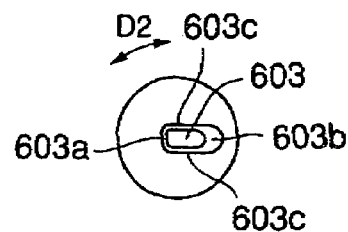
FIG. 10A is a top plan view of a control member for controlling the attitude angle between the chassis sections of the hinge in a cellular phone shown as a fold-type data processing apparatus according to a fourth embodiment of the present invention.
Figure 11A:
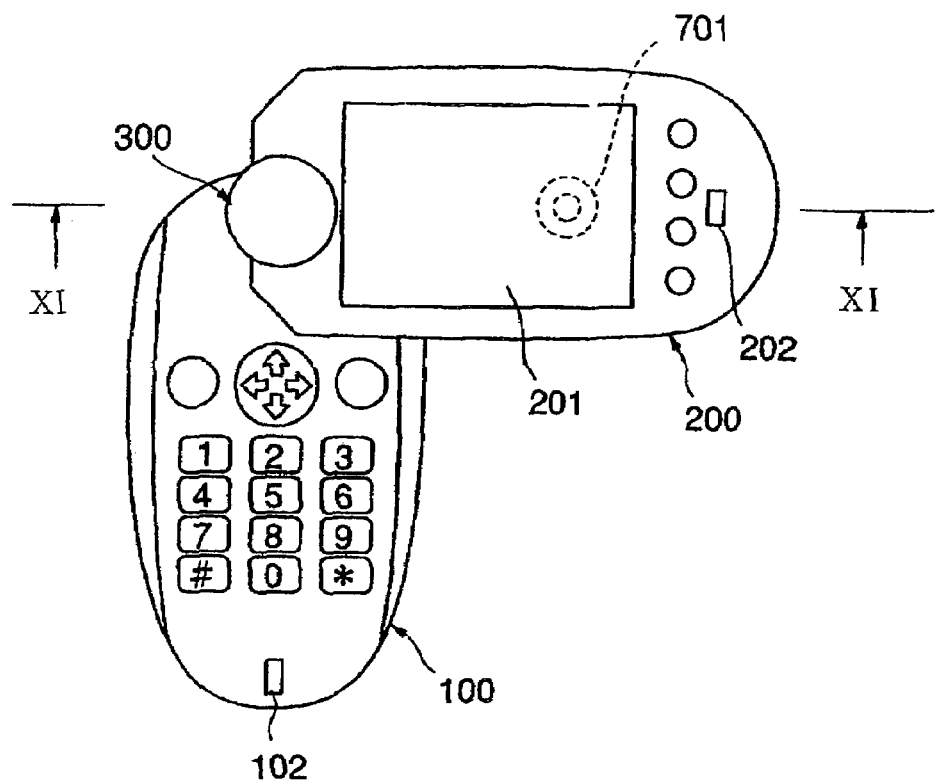
FIG. 11A is a top plan view of the cellular phone of the fourth embodiment in the swiveled position of the top chassis section.
Figure 11B:
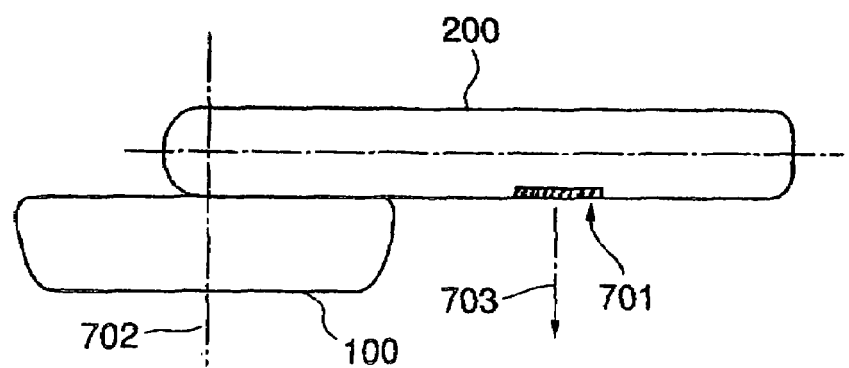
FIG. 11B is a sectional view taken along line XI-XI in FIG. 11A.

As shown in FIG. 10A, the control member 603 in the present embodiment is such that a truncated cone is prolonged in the posterior direction of the cellular phone, wherein the slanted angle of the prolonged truncated cone is changed among the front, rear and lateral sides thereof. More specifically, the slanted angle of the control member 603 is maximum at the front side 603a and lateral sides 603c, and minimum at the rear side 603b, with the slanted angle of the intermediate side being moderately changed. The slanted angle of the front side 603a and lateral sides 603c is designed such that the top unit 200 is folded onto the bottom unit 100 at an attitude angle of zero degree upon abutment of the projection 306a or 306b to the control member 603. On the other hand, the slanted angle at the rear side 603b is designed such that the top unit 200 is unfolded at an attitude angle of 160 degrees with respect to the bottom unit 100 upon abutment of the second projection 306b to the control member 603.

Figure 10B:
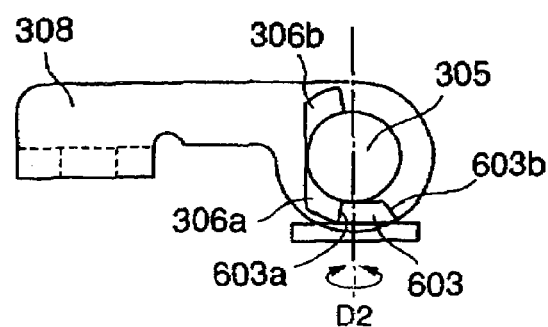
FIG. 10B is a schematic side view of the hinge in the first folded position of the hinge in the fourth embodiment.

As illustrated in the folded position of FIG. 10B, the first projection 306a abuts the front side 603a of the control member 603, whereby the top unit 200 is folded onto the bottom unit 100 at an attitude angle of zero degree therebetween. A slot, such as the slot 303a in the first embodiment, may be provided on the control member 603.

Figure 10C:
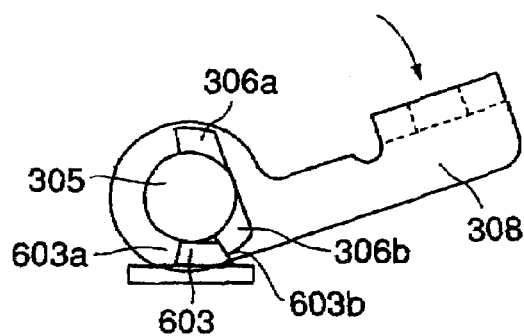
FIG. 10C is a schematic side view of the hinge in an unfolded position thereof in the fourth embodiment.

When the top unit 200 is unfolded from the folded position of FIG. 10B, the second projection 306b on the shaft 305 abuts the rear side 603b of the control member, as shown in FIG. 10C. This, allows the top unit 200 to be stopped at an attitude angle of 160 degrees with respect to the bottom unit 100.

When the top unit 200 is swiveled in the direction D2 from the unfolded position of FIG. 10C, the second projection 306b moves along the side wall of the control member 603 while abutting thereto. Since the control member 603 has a slanted angle profile wherein the slanted angle increases from the rear side 603b toward the lateral side 603c, the attitude angle of the top unit 200 with respect to the bottom unit 100 defined by the second projection 306b increases when the top unit 200 is swiveled from the unfolded position. Thus, the attitude angle of the top unit 200 assumes 180 degrees upon abutment of the second projection 306b to the lateral side 603c of the control member 603, as shown in FIGS. 11A and 11B. At this attitude of the cellular phone, the user can operate the keyboard and watch the display unit comfortably.

Figure 10D:
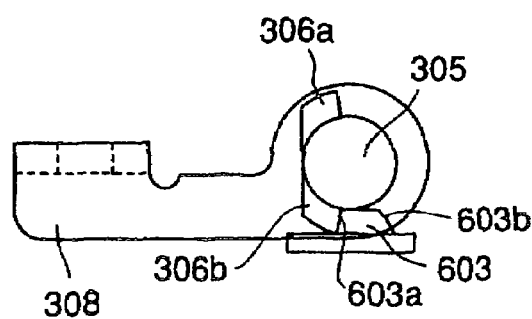
FIG. 10D is a schematic side view of the hinge in the second folded position thereof in the fourth embodiment.

When the top unit 200 is further swiveled from the 90-degree swiveled position of FIGS. 11A and 11B, the second projection 306b abuts the front side 603a of the control member 603, as shown in FIG. 10D, whereby the top unit 200 is folded onto the bottom unit 100 at an attitude angle of 180 degrees.

Again in the present embodiment, the abutment surfaces of the projections 306a and 306b correspond to the contour of the side wall of the control member 603, as will be described later.

As illustrated in FIGS. 11A and 11B, the top unit 200 is parallel to the bottom unit 100 upon a 90-degree swiveled position of the top unit 200 in the present embodiment. This attitude is convenient for operating a camera unit in the case where the lens (or opening) 701 of the camera unit is provided on the top surface of the top unit 200.

As illustrated in FIGS. 11A and 11B, the display unit 201 is conveniently used as a monitor for operating the camera unit having the lens 701. In the illustrated attitude of the cellular phone, since the top unit 200 is parallel to the bottom unit 100, the visual line of the user observing the monitor 201 is conveniently parallel to the visual axis 703 of the lens 701.

As described in connection with the third and fourth embodiments, the slanted angle profile, wherein the slanted angle of the control member 503 or 603 is changed along with the swivel movement of the top unit 200, controls the attitude angle of the top unit 200 during the swivel movement of the top unit 200 for the convenience of handling the cellular phone.

In other words, the swivel movement of the top unit 200 in the direction D2 is converted to the turning movement of the top unit 200 in the direction D1 by the slanted angle profile of the control member 503 or 603. This means that the combination of the projections on the shaft and the control member configures a cam assembly.

Figure 12:
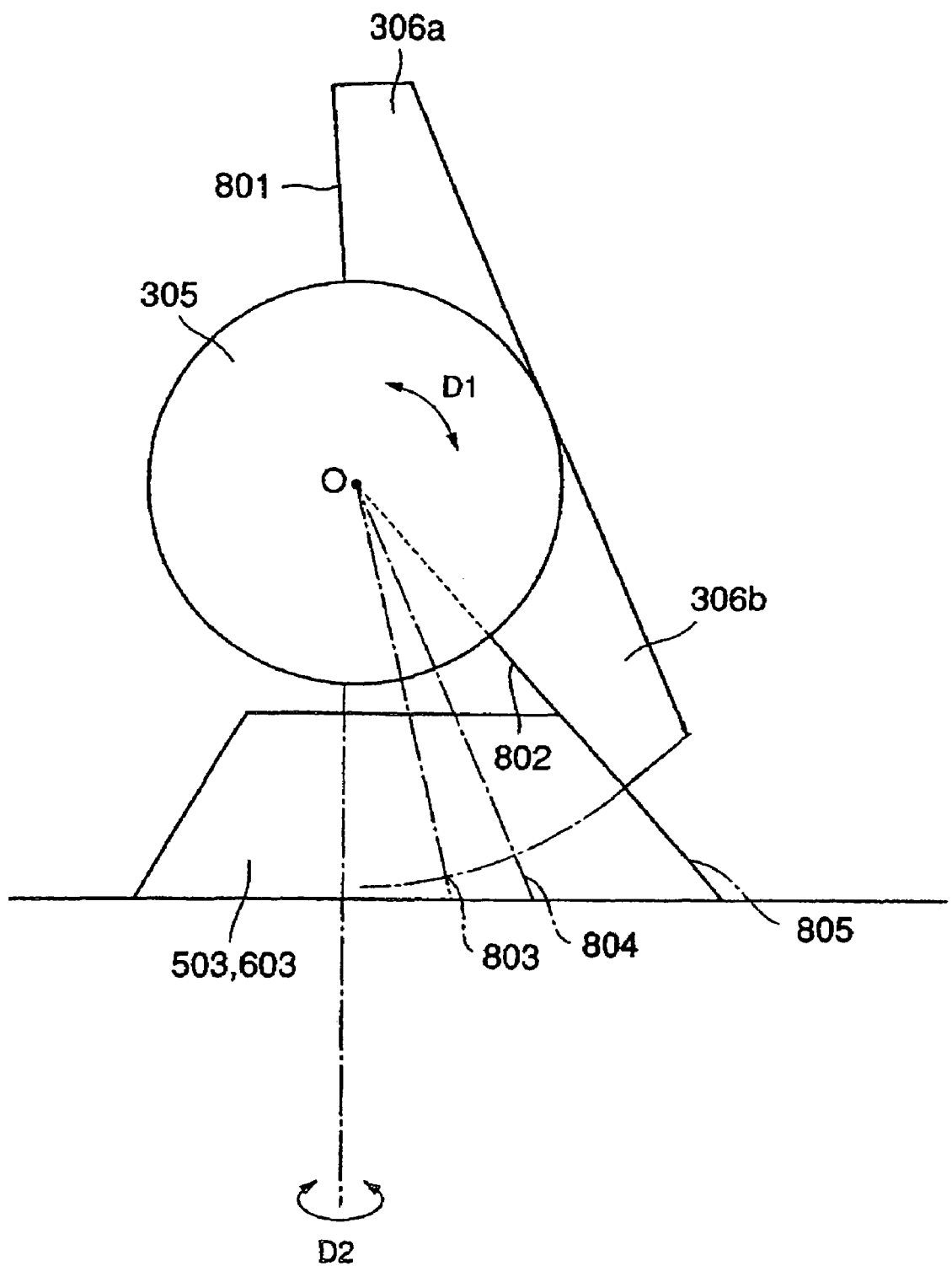
FIG. 12 is a schematic diagram exemplifying the abutment between the projections on the shaft and the control member in the fold-type data processing apparatus according to the embodiment of the present invention.

Referring to FIG. 12, there is shown a contact angle of the projection 306b, exemplifying the relationship between the projections 306a and 306b on the shaft 305 and the control member 503 (603) in the third (fourth) embodiment.

In view that the slanted angle profile, wherein the slanted angle of the control member 503 changes along with the swiveled angle of the top unit 200, increases the mechanical load during the swivel movement of the top unit 200, the abutment surfaces 801 and 802 of the projections 306a and 306b as well as the tangential line of the side wall of the control member 503 is designed to align with the radial direction of the shaft 305, as illustrated in FIG. 12.

In the example of FIG. 12, the abutment surface 802 is aligned with the radial direction of the shaft 305, and other abutment surfaces 803 and 804 illustrated by imaginary lines are also aligned with the radial direction of the shaft 305.

The configuration shown in FIG. 12 provides a highest mechanical efficiency in the swiveling movement of the top unit 200 with respect to the bottom unit 100 while allowing the first or second projection 306a or 306b to abut the side wall of the control member 503. This configuration also provides an improvement of the mechanical strength of the components, whereby deformation of the first and second projections 306a and 306b as well as the control member 503 can be prevented, such as upon abutment of the second projection 306b to the control member 503 during an unfolding movement of the top unit 200.

In the above embodiment, the hinge of the present invention is used in the cellular phone; however, the hinge of the present invention can be used in any of the fold-type data processing apparatus.

Since the above embodiments are described only for examples, the present invention is not limited to the above embodiments and various modifications or alterations can be easily made therefrom by those skilled in the art without departing from the scope of the present invention.

What is claimed is:

1. A hinge mechanism comprising:
   a base;
   a shaft having a first axis;
   a first support member for supporting said shaft and allowing said shaft to rotate around said first axis;
   a second support member for supporting said first support member with respect to said base and allowing said first support member and said shaft to swivel with respect to said base around a second axis perpendicular to said first axis; and
   a cam assembly for converting a swivel movement of said shaft with respect to said base to a rotational movement of said shaft,
   wherein said cam assembly comprises:
      at least one projection member fixed onto said shaft; and
      a control member having a side wall and fixed onto said base,
      wherein said at least one projection member abuts said side wall in an open position of said hinge mechanism so as to limit rotation of said hinge mechanism around the first axis; and
      said at least one projection member is operable to slide along said side wall so as to rotate around the second axis upon the swivel movement of said shaft.

2. The hinge mechanism according to claim 1, wherein at least a portion of said side wall has a slanted surface, and wherein said at least one projection member abuts said slanted surface to restrict a movement of said shaft.

3. The hinge mechanism according to claim 1, wherein said at least one projection member comprises first and second projection members which are fixed onto said shaft; and
   said control member has a shape of a trapezoid as viewed parallel to said first axis, wherein:
   said first projection member abuts a first portion of said side wall in a closed position of said hinge mechanism;
   said second projection member abuts a second portion of said side wall in the open position of said hinge mechanism; and said second projection member moves along said side wall while abutting thereto upon the swivel movement of said shaft to restrict a rotational movement of said shaft.

4. The hinge mechanism according to claim 2, wherein a slant angle of said side wall changes in a circumferential direction of said control member.

5. The hinge mechanism according to claim 4, wherein said slant angle increases from a rear side of said control member toward a front side of said control member.

6. The hinge mechanism according to claim 3, wherein said control member comprises a slot which is engaged by said first projection member.

7. The hinge mechanism according to claim 2, wherein said cam assembly is configured so that, when said shaft is rotated, said at least one projection member is movable from a first position where said at least one projection member is separated from said control member to a second position where said at least one projection member is abutted against said control member.

8. The hinge mechanism according to claim 3, wherein said cam assembly is configured so that, when said shaft is rotated, said first projection member is movable from a first position where said first projection member is separated from said control member to a second position where said first projection member is abutted against said control member.

9. The hinge mechanism according to claim 8, wherein said second projection member is movable from a third position where said second projection member is separated from said control member to a fourth position where said second projection member is abutted against said control member.

10. A hinge mechanism comprising:
a base;
a shaft having a first axis;
a first support member for supporting said shaft and allowing said shaft to rotate around said first axis;
a second support member for supporting said first support member with respect to said base and allowing said first support member and said shaft to swivel with respect to said base around a second axis perpendicular to said first axis; and
a cam assembly for converting a swivel movement of said shaft with respect to said base to a rotational movement of said shaft,
wherein said cam assembly comprises:
first and second projection members fixed onto said shaft; and
a control member having a side wall and fixed onto said base, said control member having a shape of a trapezoid as viewed parallel to said first axis, wherein,
said first projection member abuts a first portion of said side wall in a closed position of said hinge mechanism;
said second projection member abuts a second portion of said side wall in an open position of said hinge mechanism; and
said second projection member moves along said side wall while abutting thereto upon a swivel movement of said first support member and said shaft to restrict a rotational movement of said shaft.

11. The hinge mechanism according to claim 10, wherein said control member comprises a slot which is engaged by said first projection member.

12. The hinge mechanism according to claim 10, wherein said cam assembly is configured so that, when said shaft is rotated, said first projection member is movable from a first position where said first projection member is separated from said control member to a second position where said first projection member is abutted against said control member.

13. The hinge mechanism according to claim 12, wherein said second projection member is movable from a third position where said second projection member is separated from said control member to a fourth position where said second projection member is abutted against said control member.

14. A hinge mechanism comprising:
a base;
a shaft having a first axis;
a first support member for supporting said shaft and allowing said shaft to rotate around said first axis;
a second support member for supporting said first support member with respect to said base and allowing said first support member and said shaft to swivel with respect to said base around a second axis perpendicular to said first axis; and
a cam assembly for converting a swivel movement of said shaft with respect to said base to a rotational movement of said shaft,
wherein said cam assembly comprises at least one projection member fixed onto said shaft and a control member fixed onto said base and having a side wall, at least a portion of said side wall having a slanted surface, and wherein said projection member abuts said slanted surface to restrict a movement of said shaft,
wherein a slant angle of said side wall changes in a circumferential direction of said control member, and
wherein said slant angle increases from a rear side of said control member toward a front side of said control member.

15. The hinge mechanism according to claim 14, wherein said cam assembly is configured so that, when said shaft is rotated, said at least one projection member is movable from a first position where said at least one projection member is separated from said control member to a second position where said at least one projection member is abutted against said control member.

16. The hinge mechanism according to claim 14, wherein said at least one projection member comprises first and second projection members, and said cam assembly is configured so that, when said shaft is rotated, said first projection member is movable from a first position where said first projection member is separated from said control member to a second position where said first projection member is abutted against said control member.

17. The hinge mechanism according to claim 16, wherein said second projection member is movable from a third position where said second projection member is separated from said control member to a fourth position where said second projection member is abutted against said control member.

* * * * *